US006206306B1

(12) United States Patent
McFarlane (10) Patent No.: US 6,206,306 B1
(45) Date of Patent: *Mar. 27, 2001

(54) DISCHARGE APPARATUS FOR DISCHARGING MATERIALS

(75) Inventor: Claude L. McFarlane, Madison, WI (US)

(73) Assignee: Knight Manufacturing Corp., Brodhead, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,479

(22) Filed: Sep. 11, 1999

Related U.S. Application Data

(63) Continuation-in-part of application No. 08/871,425, filed on Jun. 9, 1997, now Pat. No. 6,024,305.

(51) Int. Cl.[7] ............................................. A01C 17/00
(52) U.S. Cl. .................... 239/684; 239/689; 239/658; 239/69
(58) Field of Search ................................ 239/63, 67, 69, 239/155, 658, 665, 668, 676, 677, 683, 684, 687, 689; 364/145, 420

(56) References Cited

U.S. PATENT DOCUMENTS

| | | | |
|---|---|---|---|
| 3,241,841 | * | 3/1966 | Kucera ................................. 239/658 |
| 4,373,668 | * | 2/1983 | Forbes et al. ..................... 239/684 X |
| 4,630,773 | * | 12/1986 | Ortlip ................................ 239/155 X |
| 5,186,396 | * | 2/1993 | Wise et al. ........................ 239/684 X |
| 5,318,226 | * | 6/1994 | Kime et al. ....................... 239/687 X |
| 5,653,389 | * | 8/1997 | Henderson et al. .................... 239/69 |
| 5,927,603 | * | 7/1999 | McNabb .............................. 239/69 X |
| 6,024,305 | * | 2/2000 | McFarlane ......................... 239/69 X |

* cited by examiner

Primary Examiner—Andres Kashnikow
Assistant Examiner—Steven J. Ganey
(74) Attorney, Agent, or Firm—David J. Archer (57) ABSTRACT

A discharge apparatus is disclosed for discharging materials from a container onto an open area such as a field. The apparatus includes a power discharge device which is disposed adjacent to a discharge outlet defined by the container. The arrangement is such that when the apparatus is being used to spread the materials onto the open area such as the field, the materials move from the container through the outlet towards the power discharge device for discharging the materials at a location on the field. A power source is drivingly connected to the power discharge device for rotating the power discharge device. A power sensor is provided for sensing the power supplied by the power source which is approximately the power used by the power discharge device, the power sensor generating a first signal which is correlated to the spread rate of the materials discharged.

27 Claims, 8 Drawing Sheets

DISCHARGE APPARATUS FOR DISCHARGING MATERIALS

CROSS REFERENCE TO RELATED APPLICATION

The subject application is a continuation-in-part of U.S. Ser. No. 08/871,425 filed Jun. 9, 1997. All the subject matter of U.S. Ser. No. 08/871,425 is incorporated herein by reference now U.S. Pat. No. 6,024,305.

BACKGROUND OF THE INVENTION

1. Field of the Invention

The present invention relates to a discharge apparatus for discharging materials from a container onto an open area such as a field.

More specifically, the present invention relates to a discharge apparatus for discharging materials from a manure spreader container onto any open area such as a field.

2. Background Information

Normally, when manure or other fertilizers are to be spread over a field to be cultivated, the manure is evenly spread over the entire surface of the field.

However, each field has inherent characteristics which make it advantageous to apply varying quantities of the fertilizer to different parts of the field.

For example, certain parts of the field such as a valley portion may have a relatively deep soil coverage whereas an elevated portion of the same field may have had much of the soil eroded therefrom thus requiring a relative increase in soil nutrient replacement.

In view of the requirements for a variable spread of manure over the area of the field, spreader programs have been developed which optimize the amount of fertilizer required for each portion of the field.

The aforementioned programs are sometimes developed by combining the results of individual soil sample analyses taken from the various portions of the field. Accordingly, a map of the field is generated together with a set spread pattern so that the amount of fertilizer is adjusted manually to correspond with the previously determined spread requirements.

Therefore, by utilizing the spreader program, a farmer is able to raise crops of uniform quality throughout the entire field under cultivation.

In recent years, satellites have enabled the accurate determination of the actual location of a spot on the surface of the earth within a few feet and to provide not only a read out of the longitude and latitude but also the elevation of such a location. Such a means for ascertaining a location is known in the art as a "global positioning system" or GPS.

The present invention combines the aforementioned GPS technology with a land survey such that the actual location of a spreader spreading material in an open area such as a field can be continuously monitored. Such a system in combination with a soil requirement survey enables the generation of a program for regulating the amount of materials spread at any location on the open area such as a field.

Accordingly, for a particular location, the soil requirement is determined from the survey "map" so that the program generates a signal which may be used to regulate the amount of materials spread to optimize crop cultivation.

More specifically, such regulation may include one or more of the following discharge regulator arrangements:

1) Control of the power supplied from the driving motor to the discharge means.
2) Adjusting the opening of a door between the manure container and the discharge apparatus.
3) Regulating the land speed of the apparatus.
4) Altering the rotational speed of a discharge auger disposed in the materials container.

Therefore, it is a primary feature of the present invention to provide a discharge apparatus that overcomes the problems associated with the prior art proposals and which makes a considerable contribution to the art of spreading materials and the like on a field.

Another feature of the present invention is the provision of a discharge apparatus that includes a variable delivery discharge controlled by a program that optimizes the materials spread pattern.

Other features and advantages of the present invention will be readily apparent to those skilled in the art by a careful consideration of the detailed description contained hereinafter taken in conjunction with the annexed drawings.

SUMMARY OF THE INVENTION

The present invention relates to a discharge apparatus and method for discharging materials onto a field or open area to be cultivated.

More particularly, the present invention concerns a discharge apparatus for discharging materials from a container onto an open area such as a field. The apparatus includes a power discharge device which is disposed adjacent to a discharge outlet defined by the container. The arrangement is such that when the apparatus is being used to spread the materials onto the open area such as the field, the materials move from the container through the outlet towards the power discharge device for discharging the materials at a location on the field. A power source is drivingly connected to the power discharge device for rotating the power discharge device. A power sensor is provided for sensing the power supplied by the power source which is approximately the power used by the power discharge device, the power sensor generating a first signal which correlates to a spread rate of the materials discharged.

Many modifications and variations of the present invention will be readily apparent to those skilled in the art by a consideration of the detailed description of a preferred embodiment of the present invention. However, such modifications and variations fall within the spirit and scope of the present invention as defined by the appended claims. Included in such modifications would be the provision of a device secured to the apparatus for continuously monitoring and analyzing the soil as the apparatus moves over the field. Such analysis could include moisture content and/or the mineral content of the soil.

Also, although the detailed description describes a load cell arrangement for sensing the tension and the amount of material discharged, those skilled in the art will appreciate that when a hydraulic motor is used for driving the power discharge means, the hydraulic power within the hydraulic motor will be directly related to the amount of materials discharged. Similarly, in the case of an electric motor drive, the electrical power supplied will be proportional to the rate of discharge of the materials.

BRIEF DESCRIPTION OF THE DRAWINGS

Similar reference characters refer to similar parts throughout the various embodiments of the present invention.

DETAILED DESCRIPTION OF EMBODIMENTS OF THE PRESENT INVENTION

Figure 1:
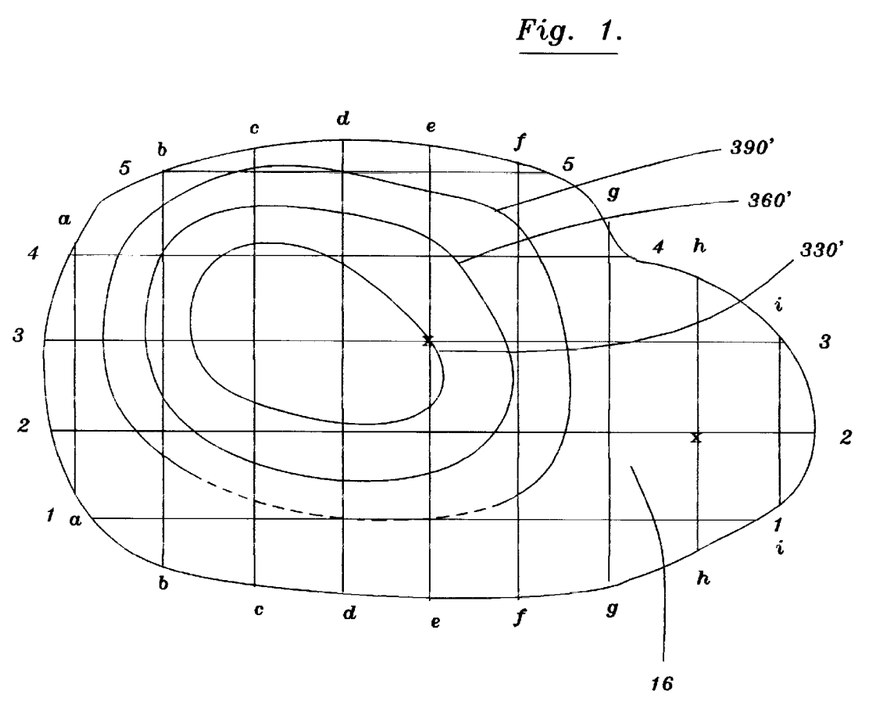
FIG. 1 is a diagrammatic plan view of a survey map of a field to be cultivated.

FIG. 1 is a diagrammatic plan view of a survey map of a field to be cultivated. The map shows a field 16 divided into portions having coordinates a–i , 1–5. The map also shows the elevation of the field. For example, coordinate e,3 is low lying and may not require as much fertilizer as portion h,2 which is at a relatively high elevation of 390 feet.

Figure 2:
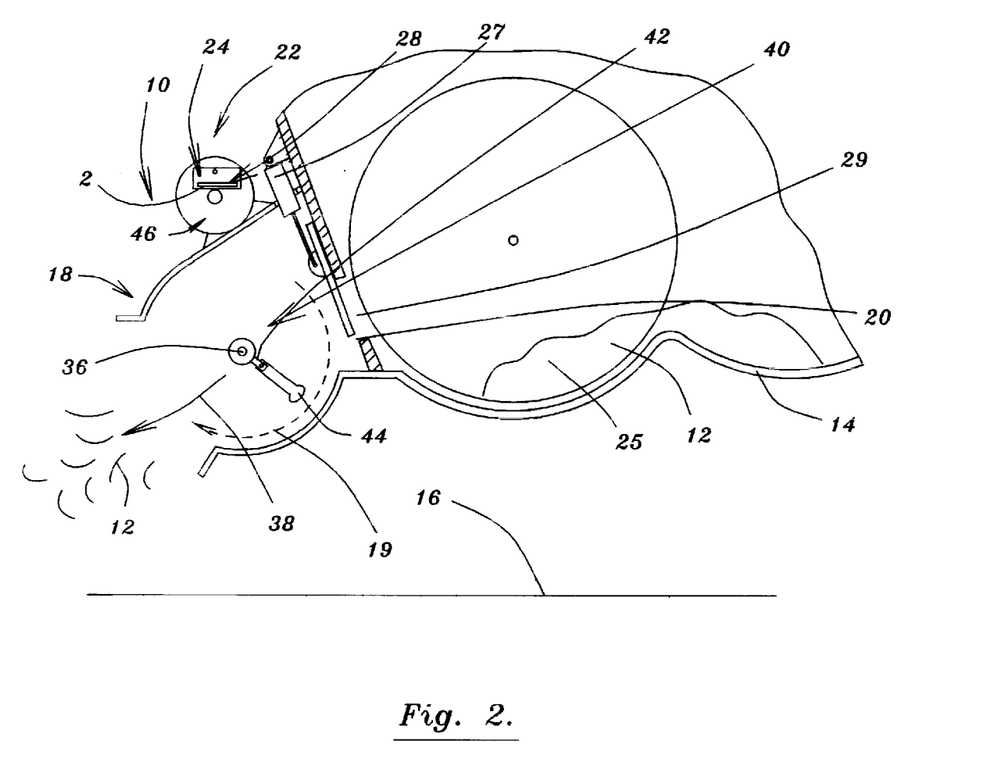
FIG. 2 is a side elevational view partially in section of a discharge apparatus according to the present invention.

FIG. 2 is a sectional view of a discharge apparatus generally designated 10 according to the present invention.

As shown in FIG. 2, the discharge apparatus 10 is used for discharging materials 12 onto a field 16 or open area to be cultivated.

The apparatus 10 includes a power discharge means generally designated 18 which is disposed adjacent to a discharge outlet 20 defined by a container 14. The arrangement is such that when the apparatus 10 is being used to spread the materials 12 onto the open area such as the field 16, the materials 12 move from the container 14 through the outlet 20 towards the power discharge means 18 for discharge at a location such as location e,3 on the field 16 as shown in FIG. 1.

A power means generally designated 22 is drivingly connected to the power discharge means 18 for rotating the power discharge means 18 as indicated by the arrow 19.

Figure 3:
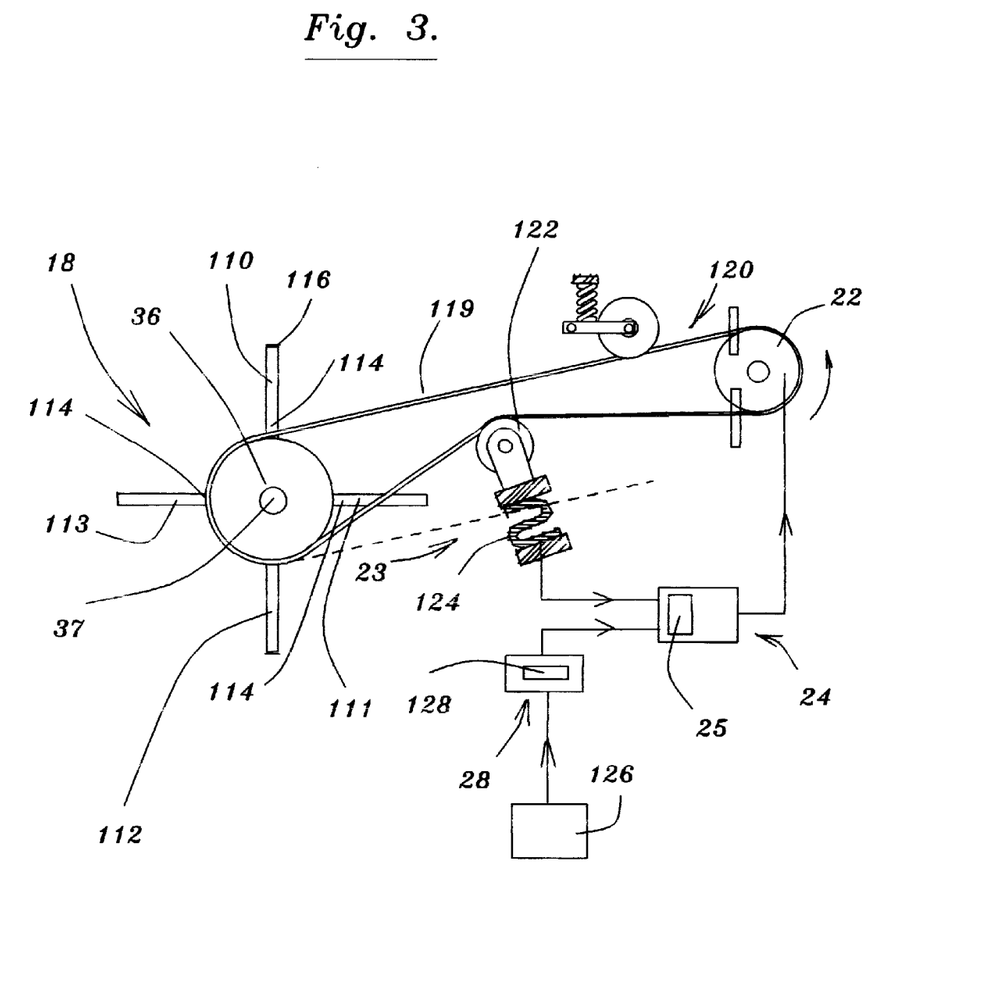
FIG. 3 is a schematic view of the discharge apparatus shown in FIG. 2.

FIG. 3 is a side elevational view partially in section of the power discharge means 18 shown in FIG. 2. As shown in FIG. 3 a power sensing means generally designated 23 is provided for sensing the power supplied by the power means 22 which is approximately the same as the power used by the power discharge means 18. The power sensing means 23 generates a first signal which is proportional to the power supplied by the power means 22 which is correlated to the amount of material discharged.

A control means generally designated 24 is connected to the power sensing means 23 such that the first signal is fed into the control means 24.

A means generally designated 28 which may be programmable is connected to the control means 24, the means 28 generating a second signal that is fed into the control means 24.

Also, the control means 24 includes a comparator circuit 25 for comparing the first and the second signals. The comparator circuit 25 generates a third signal based on a comparison of the first and second signals. The arrangement is such that the third signal is used for variably controlling the particular rate at which the materials 12 are discharged so that when the container 14 is moved across the field 16, the materials 12 are discharged.

As shown in FIGS. 2 and 3 the power discharge means 18 includes an axle 36 rotatably driven about a rotational axis 37 by the power means 22.

Also, a plurality of arms 110, 111, 112 and 113 are connected to the axle 36 as shown in FIG. 3. Each of the arms 110–113 has a first and a second end 114 and 116 respectively. Each of the first ends 114 of the arms are secured in spaced relationship along the axle 36, the arms 110–113 extending outwardly away from the axle 36 so that on rotation of the axle 36 as indicated by the arrow 19, the arms 110–113 propel the materials 12 in a direction as indicated by the arrow 38 from the container 14 and through the power discharge means 18.

As shown in FIGS. 2 and 3, the axle 36 is disposed horizontally.

Figure 4:
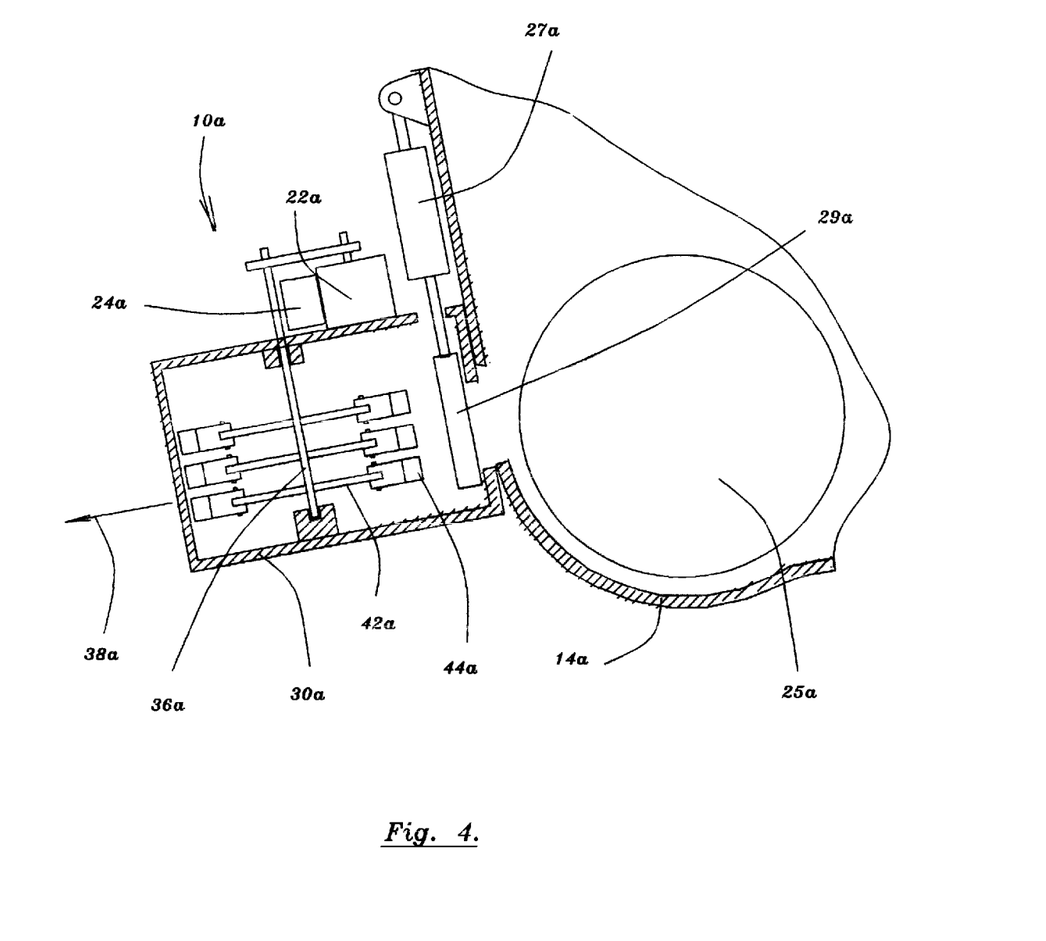
FIG. 4 is a similar view to that shown in FIG. 2 but shows a further embodiment of the present invention.

FIG. 4 is a similar view to that shown in FIG. 2 but shows another embodiment of the present invention, in which the axle 36a is disposed substantially vertically.

Figure 5:
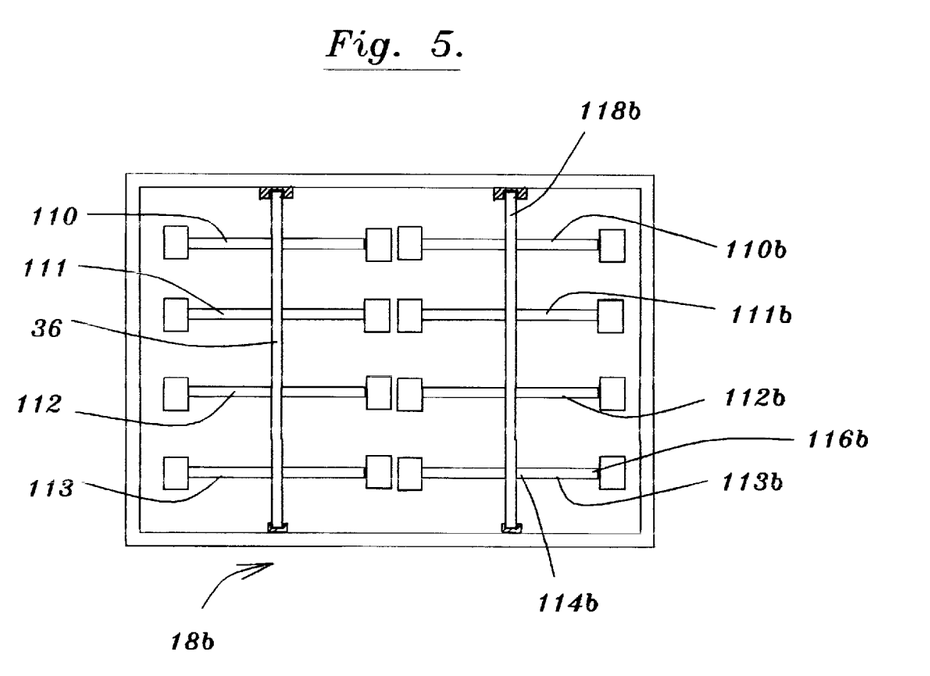
FIG. 5 is a front end view of another embodiment of the present invention.

FIG. 5 is a front end view of yet another embodiment of the present invention. As shown in FIG. 5 a further axle 118b is disposed parallel and spaced relative to the axle 36. Also, a further plurality of arms 110b, 111b, 112b and 113b are connected to the further axle 118b. Each of the further arms 100b–113b has a first and a second end 114b and 116b respectively. Each of the first ends 114b of the further arms 110b–113b are secured in spaced relationship along the further axle 118b, the further arms 110b–113b extending outwardly away from the further axle 118b so that on rotation of the further axle 118b, the further arms 110b–113b cooperate with the arms 110–113 to propel the materials in a direction 38b from the container 14b and through the power discharge means 18b.

As shown in FIG. 2, each of the second ends 116 of the arms 110–113 include a hammer 44.

As shown in FIG. 3, the power means 22 is a hydraulic motor.

Figure 6:
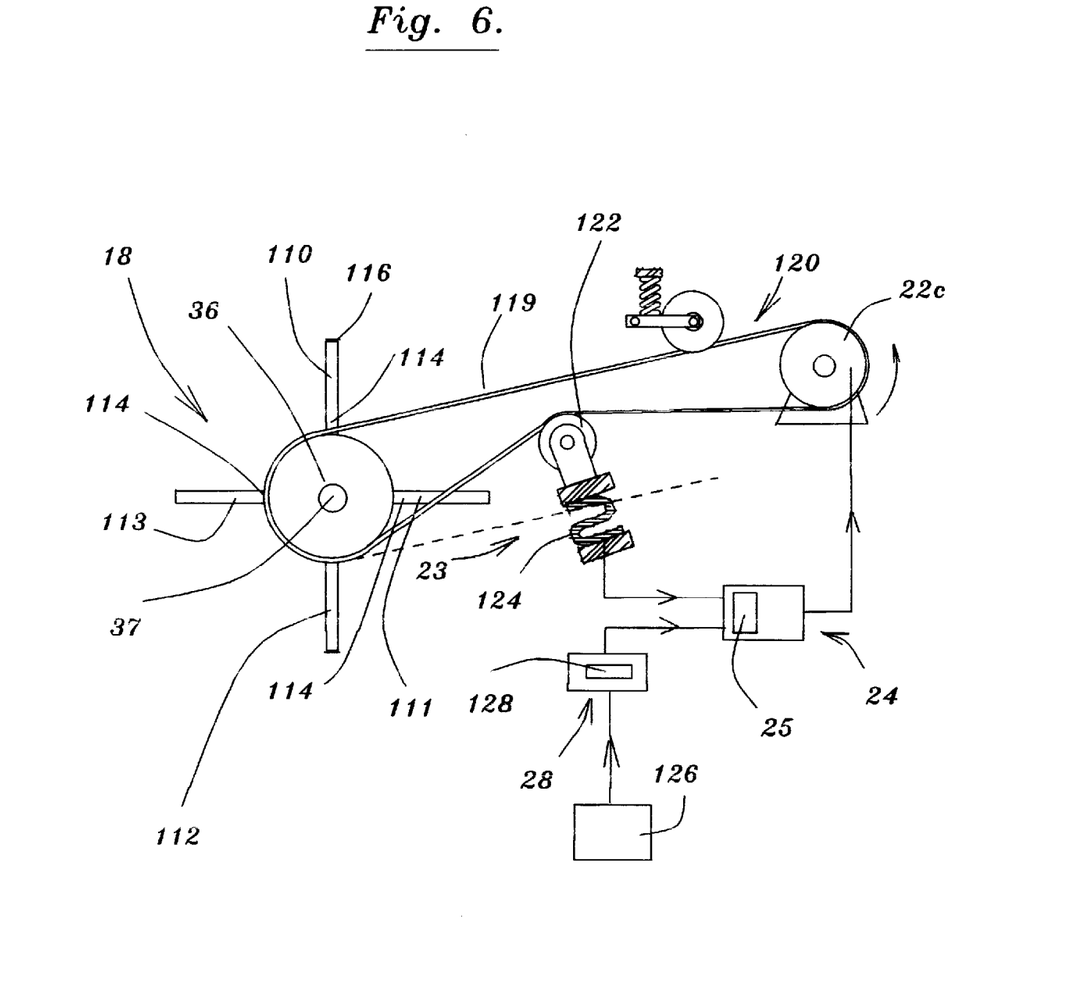
FIG. 6 is a similar view to that shown in FIG. 3 but shows another embodiment of the present invention.

FIG. 6 is a similar view to that shown in FIG. 3. However, FIG. 6 shows another embodiment of the present invention in which the power means 22c is an electric motor.

Figure 7:
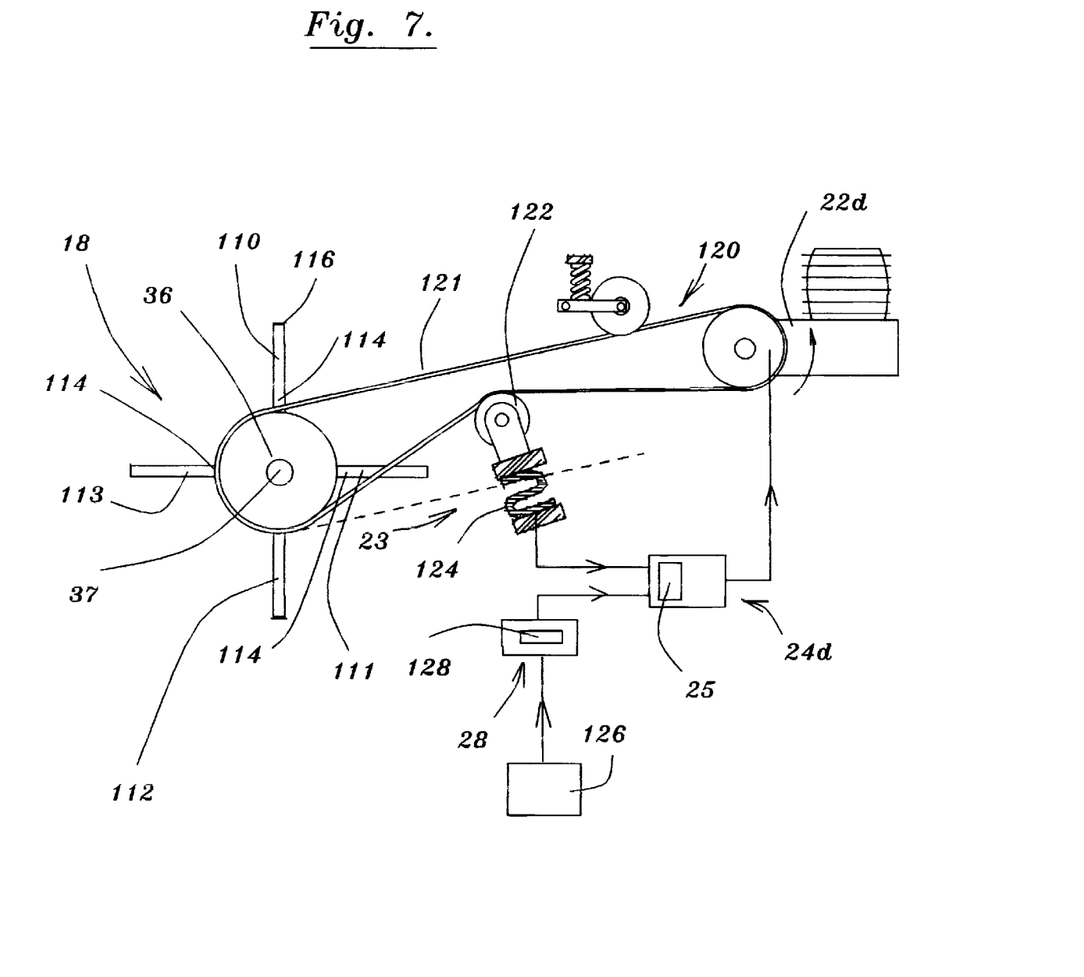
FIG. 7 is a similar view to that shown in FIG. 3 but shows yet another embodiment of the present invention.

Also, FIG. 7 is a similar view to that shown in FIG. 3. However, FIG. 7 shows yet another embodiment of the present invention, in which the power means 22d is a gas engine.

Figure 8:
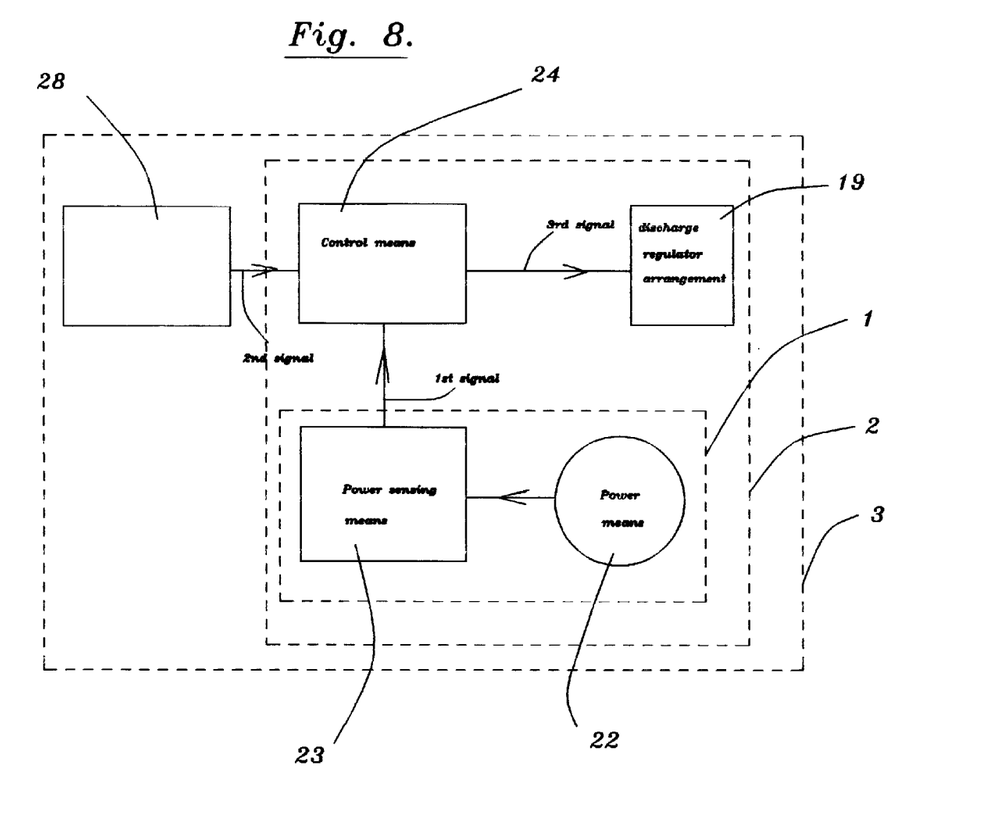
FIG. 8 is a schematic representation of the discharge apparatus concept according to the present invention.

FIG. 8 is a schematic representation of the power discharge apparatus concept according to the present invention.

As shown in FIG. 8, in the broadest aspect of the present invention as indicated by the dashed box 1, the power means 22 is connected to the power sensing means 23 which sends a first signal which correlates to the spread rate of the power discharge means 18.

In another aspect of the present invention, as indicated by the dashed box 2, a control means 24 is connected to the power sensing means 23 for permitting control of the spread rate.

In yet another aspect of the present invention, as indicated by the dashed box 3, a means 28 which may be programmable, is connected to the control means 24, the means 28 sending a second signal to the control means 24. A comparator circuit within the control means 24 compares the first and second signal and generates a third signal based on the comparison. The third signal is used for adjusting the spread rate of the power discharge means 18 by means of a discharge regulator apparatus 19.

As shown in FIG. 3, the apparatus 10 also includes a drive belt 118 for drivingly connecting the power means 22 to the power discharge means 18.

More specifically, the power sensing means 23 includes a driving device generally designated 120 which extends from the power means 22 to the power discharge means 18 for driving the power discharge means 18. Furthermore, a pulley 122 cooperates with the driving device 120 such that the pulley 122 bears against the driving device 120.

A load cell 124 is disposed adjacent to the pulley 122 such that as the pulley 122 bears against the driving device 120, the load cell 124 senses a change in tension of the driving device 120. The change in tension is proportional to the power supplied by the power means 22 so that the load cell 124 generates the first signal which is proportional to the power supplied by the power means 22.

As shown in FIG. 3, the driving device 120 is a belt drive 119. However, in another embodiment of the present invention as shown in FIG. 7, the driving device 120 is a chain drive 121.

In one embodiment of the present invention as shown in FIG. 3, the control means 24 is an electronic control.

However, in the embodiment as shown in FIG. 7, the control means 24d is a hydraulic control circuit.

The means 28 in one embodiment of the invention includes a prerecorded memory which generates the second signal which is unique to a soil analysis of the location such as e,3 on the field 16 as shown in FIG. 1.

A global positioning system 126 is provided for determining when the power discharge means 18 is disposed over the location such as e,3 on the field 16, the second signal being triggered when the location such as e,3 on the field is determined by the global positioning system 126 so that the materials 12 are discharged at the particular rate at the location such as e,3 on the field.

More specifically, the prerecorded memory may be a magnetic tape 128 or other means for storing information which is compiled from data supplied from the soil analysis for a plurality of locations such as e,3 and h,2 and other locations within the field as shown in FIG. 1.

Also, the global positioning system 126 operates in conjunction with source of information 128 such that when the global positioning system 126 determines that the power discharge means 18 is disposed in a vicinity of one of the locations such as e,3 of the plurality of locations e,3, h,2, the source of information 128 is operative to supply the second signal which is unique to the one of the locations such as e,3 so that the second signal is fed to the comparator circuit 25 for assisting in varying the power discharge means 18 to correspond with the soil analysis for the one location such as e,3 such that the particular rate of discharge is achieved.

The first signal also is compared by the comparator circuit 25 so that if a consistency of the material 12 being discharged varies, the comparator circuit 25 compares the first and second signals and generates the third signal based on the comparison of the first and second signals, the third signal controlling the rate of discharge of the materials 12 so that such rate is commensurate with the consistency of the material 12 and so that such rate corresponds with the soil analysis for the one location such as e,3.

More particularly, when manure is being spread on a field, such manure may be in liquid, semi-liquid, slurry, semi-solid or solid form. Such difference in consistency of the manure is known in the art as the "material factor" or MF. When manure is being spread, rotation of the power discharge means requires a different power input from the drive means when spreading liquid manure as compared to spreading a heavier manure. In the case of a liquid manure, the tension in the drive belt could be more than when spreading a solid material, depending on the amount being spread. The tension would be related to the amount of material being discharged. Hence, the tension of the drive belt measured by the load cell is related to the discharge rate and type of the manure. Accordingly, the rate of discharge can be varied in accordance with the nutritional value of the particular consistency of manure being spread.

The programmable means 28 in a preferred embodiment of the present invention includes means for storing data corresponding to information received from a survey of the field 16. It will also be understood by those skilled in the art that manual means could be used as an alternative arrangement instead of the programmable means.

The survey includes a combined global positioning system 126 and soil analysis survey.

Such survey may include any or all of the following information: Topography, moisture, soil type, crop yield, fertility.

Also, it will be understood by those skilled in the art that a LORAN type of system or an ACCUTRAK system is included in the generic term GPS.

Also, in the present invention, the first signal from the load cell can be used to alter the door opening of the power discharge means so as to maintain a constant spread rate when the revolutions per minute of the power means remains constant.

Additionally, the apparatus according to the present invention senses what is discharged so that the first signal from the sensor can be used to monitor the spread rate.

Furthermore, control of the spread rate is based on the weight of the materials spread and in most applications, an operator will know how much material can be spread on the field in accordance with government regulations. The operator will also know the category of material being spread. Accordingly, a constant spread rate can be maintained by automatically adjusting the door opening by means of a hydraulic drive or screw jack or any other method of controlling the spread rate.

The present invention enables an operator to automatically or manually vary the amount of fertilizer spread over different parts of a field to optimize crop cultivation while minimizing cost.

What is claimed is:

1. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means; and power sensing means for sensing the power supplied by the power means which is approximately the power used by said power discharge means, said power sensing means generating a first signal which is correlated to a spread rate of the materials discharged.

2. A discharge apparatus as set forth in claim 1 further including:

control means connected to said power sensing means such that said first signal is fed into said control means, the arrangement being such that said first signal is used for varying said control means for controlling said particular spread rate at which the materials are discharged.

3. A discharge apparatus as set forth in claim 2 wherein said control means is an electronic control.

4. A discharge apparatus as set forth in claim 2 wherein said control means is a hydraulic control circuit.

5. A discharge apparatus as set forth in claim 1 wherein said power means is a hydraulic motor.

6. A discharge apparatus as set forth in claim 1 wherein said power means is an electric motor.

7. A discharge apparatus as set forth in claim 1 wherein said power means is a gas engine.

8. A discharge apparatus as set forth in claim 1 further including:
   a drive belt for drivingly connecting said power means to said power discharge means.

9. A discharge apparatus for discharging materials from a container onto an open area such as a field, said apparatus comprising:
   a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;
   power means drivingly connected to said power discharge means for rotating said power discharge means;
   power sensing means for sensing the power supplied by the power means which is approximately the power used by said power discharge means, said power sensing means generating a first signal which is correlated to a spread rate of the materials discharged;
   control means connected to said power sensing means such that said first signal is fed into said control means, the arrangement being such that said first signal is used for varying said control means for controlling said particular spread rate at which the materials are discharged;
   means connected to said control means for generating a second signal that is fed into said control means; and
   said control means including:
   a comparator circuit for comparing said first and said second signals, said comparator circuit generating a third signal based on a comparison of said first and second signals, the arrangement being such that said third signal is used for variably controlling said particular spread rate at which the materials are discharged so that when the container is moved across the field, the materials are discharged.

10. A discharge apparatus for discharging materials from a container onto an open area such as a field, said apparatus comprising:
    a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;
    power means drivingly connected to said power discharge means for rotating said power discharge means;
    power sensing means for sensing the power supplied by the power means which is approximately the power used by said power discharge means, said power sensing means generating a first signal which is correlated to a spread rate of the materials discharged;
    said discharge means including:
    an axle rotatably driven about a rotational axis by said power means; and
    a plurality of arms connected to said axle, each of said arms having a first and a second end, each of said first ends of said arms being secured in spaced relationship along said axle, said arms extending outwardly away from said axle so that on rotation of said axle, said arms propel the materials in a direction from the container and through said power discharge means.

11. A discharge apparatus as set forth in claim 10 wherein said axle is disposed horizontally.

12. A discharge apparatus as set forth in claim 10 wherein said axle is disposed vertically.

13. A discharge apparatus as set forth in claim 10 further including:
    a further axle disposed parallel and spaced relative to said axle;
    a further plurality of arms connected to said further axle, each of said further arms having a first and a second end, each of said first ends of said further arms being secured in spaced relationship along said further axle, said further arms extending outwardly away from said further axle so that on rotation of said further axle, said further arms cooperate with said arms to propel the materials in a direction from the container and through said power discharge means.

14. A discharge apparatus as set forth in claim 10 wherein each of said second ends of said arms include a hammer.

15. A discharge apparatus for discharging materials from a container onto an open area such as a field, said apparatus comprising:
    a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;
    power means drivingly connected to said power discharge means for rotating said power discharge means;
    power sensing means for sensing the power supplied by the power means which is approximately the power used by said power discharge means, said power sensing means generating a first signal which is correlated to a spread rate of the materials discharged;
    said power sensing means including:
    a driving device extending from said power means to said power discharge means for driving said power discharge means;
    a pulley cooperating with said driving device such that said pulley bears against said driving device; and
    a load cell disposed adjacent to said pulley such that as said pulley bears against said driving device, said load cell senses a change in tension of said driving device, said change in tension being proportional to said power supplied by said power means so that said load cell generates said first signal which is proportional to said power supplied by said power means.

16. A discharge apparatus as set forth in claim 15 wherein said driving device is a belt drive.

17. A discharge apparatus as set forth in claim 15 wherein said driving device is a chain drive.

18. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means;

power sensing means for sensing the power supplied by the power means which is approximately the power used by said power discharge means, said power sensing means generating a first signal which is correlated to a spread rate of the materials discharged;

control means connected to said power sensing means such that said first signal is fed into said control means, the arrangement being such that said first signal is used for varying said control means for controlling said particular spread rate at which the materials are discharged;

means connected to said control means for generating a second signal that is fed into said control means;

said control means including:

a comparator circuit for comparing said first and said second signals, said comparator circuit generating a third signal based on a comparison of said first and second signals, the arrangement being such that said third signal is used for variably controlling said particular spread rate at which the materials are discharged so that when the container is moved across the field, the materials are discharged; and said means being connected to said control means is a programmable means.

19. A discharge apparatus as set forth in claim 18 wherein said programmable means includes:

a source of information which generates said second signal which is unique to a soil analysis of said location on the field;

a global positioning system for determining when said power discharge means is disposed over said location on the field, said second signal being triggered when said location on the field is determined by said global positioning system so that the materials are discharged at said spread rate at said location on the field.

20. A discharge apparatus as set forth in claim 19 wherein said source of information is compiled from data supplied from said soil analysis for a plurality of locations within the field;

said global positioning system operating in conjunction with said source of information such that when said global positioning system determines that said power discharge means is disposed in a vicinity of one of said locations of said plurality of locations, said source of information is operative to supply said second signal which is unique to said one of said locations so that said second signal is fed to said comparator circuit for assisting in varying said power discharge means to correspond with said soil analysis for said one location such that said particular spread rate is achieved;

said first signal also being compared by said comparator circuit so that if a consistency of the material being discharged varies, said comparator circuit compares said first and second signals and generates said third signal based on said comparison of said first and second signals, said third signal controlling said rate of discharge of the materials so that such rate is commensurate with said consistency of the material and so that such rate corresponds with said soil analysis for said one location.

21. A discharge apparatus as set forth in claim 20 further including:

an analyzing device secured to said apparatus for continuously analyzing the soil to provide said source of information.

22. A discharge apparatus as set forth in claim 20 wherein said source of information is a prerecorded memory.

23. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means;

power sensing means for sensing the power supplied by the power means which is approximately the power used by said power discharge means, said power sensing means generating a first signal which is correlated to a spread rate of the materials discharged;

control means connected to said power sensing means such that said first signal is fed into said control means, the arrangement being such that said first signal is used for varying said control means for controlling said particular spread rate at which the materials are discharged;

means connected to said control means for generating a second signal that is fed into said control means;

said control means including:

a comparator circuit for comparing said first and said second signals, said comparator circuit generating a third signal based on a comparison of said first and second signals, the arrangement being such that said third signal is used for variably controlling said particular spread rate at which the materials are discharged so that when the container is moved across the field, the materials are discharged; and said first signal providing an indication to an operator of the apparatus which permits said operator to manually control said rate at which the materials are discharged by said power discharge means.

24. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means; and power sensing means for sensing the power supplied by said power means which is approximately the power used by said power discharge means, said power sensing means generating a first signal which is directly proportional to a spread rate of the materials discharged.

25. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means;

power sensing means for sensing the power supplied by said power means which is approximately the power used by said power discharge means, said power sensing means generating a first signal which is directly proportional to a spread rate of the materials discharged;

control means connected to said power sensing means such that said first signal is fed into said control means;

means connected to said control means for generating a second signal that is fed into said control means; and said control means including:

a comparator circuit for comparing said first and said second signals, said comparator circuit generating a third signal based on a comparison of said first and second signals, the arrangement being such that said third signal is used for controlling said spread rate at which the materials are discharged so that when the container is moved across the field, the materials are discharged onto the field at an optimal spread rate.

26. A discharge apparatus as set forth in claim 25 wherein said power used by said power discharge means is a product of the revolutions per minute and the torque of said power discharge means.

27. A discharge apparatus for discharging materials from a container onto an open area such as a field, said apparatus comprising:

a power discharge means disposed adjacent to a discharge outlet defined by the container, the arrangement being such that when the apparatus is being used to spread the materials onto the open area such as the field, the materials move from the container through said outlet towards said power discharge means for discharging the materials at a location on the field;

power means drivingly connected to said power discharge means for rotating said power discharge means; and power sensing means for sensing the power supplied by the power means which is approximately the power used by the power discharge means, said power sensing means generating a first signal which is correlated to a spread rate of the materials discharged, the arrangement being such that a repeatable relationship between the power supplied and the rate of materials discharged is achieved.

* * * * *